(12) United States Patent
Powrozek (10) Patent No.: US 6,386,338 B1
(45) Date of Patent: May 14, 2002

(54) ELECTRIC PARKING BRAKE MANUAL OVERRIDE

(75) Inventor: Bryan Daniel Powrozek, Sterling Heights, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/729,254

(22) Filed: Dec. 1, 2000

(51) Int. Cl.[7] .......................... F16D 65/14; F16D 65/28; F16D 65/30
(52) U.S. Cl. .................. 188/156; 188/2 D; 188/106 P; 74/500.5; 74/502.5; 74/625; 192/83
(58) Field of Search ................................ 188/2 D, 156, 188/106 P; 74/500.5, 502.5, 502.6, 625; 464/37; 192/83

(56) References Cited

U.S. PATENT DOCUMENTS

| | | | | |
|---|---|---|---|---|
| 3,729,070 A | * | 4/1973 | Le Marchand | 188/170 |
| 4,175,646 A | | 11/1979 | Eikelberger | |
| 4,281,736 A | | 8/1981 | Lizzio | 180/271 |
| 4,561,527 A | | 12/1985 | Nakamoto | 192/4 C |
| 4,629,043 A | | 12/1986 | Matsuo et al. | 192/4 A |
| 4,717,004 A | * | 1/1988 | Hoyle | 188/2 D |
| 4,793,447 A | | 12/1988 | Taig | |
| 4,795,002 A | | 1/1989 | Burgei | 188/2 D |
| 4,799,468 A | * | 1/1989 | Farquhar | 123/400 |
| 4,804,073 A | | 2/1989 | Taig | |
| 4,817,463 A | | 4/1989 | Cameron | 74/781 R |
| 4,865,165 A | | 9/1989 | Taig | 188/156 |
| 4,895,048 A | * | 1/1990 | Key et al. | 49/139 |
| 4,895,277 A | | 1/1990 | Grenier et al. | 188/173 |
| 4,920,811 A | * | 5/1990 | Hopper | 251/129.11 |
| 5,004,077 A | | 4/1991 | Carlson et al. | 188/2 D |
| 5,078,242 A | * | 1/1992 | Ratke et al. | 192/220.4 |
| 5,180,038 A | | 1/1993 | Arnold et al. | 188/171 |
| 5,219,049 A | | 6/1993 | Unterborn | 188/156 |
| 5,293,517 A | | 3/1994 | Andruet | |
| 5,310,251 A | | 5/1994 | Towers | |
| 5,417,624 A | | 5/1995 | Weissbrich | |
| 5,485,764 A | | 1/1996 | Sugimoto et al. | 74/535 |
| 5,542,513 A | | 8/1996 | Reyes | |
| 5,590,744 A | | 1/1997 | Belmond | |
| 5,704,693 A | | 1/1998 | Mackiewicz | |
| 5,868,038 A | * | 2/1999 | Bravo | 74/500.5 |
| 5,983,745 A | * | 11/1999 | Petrak | 188/2 D |
| 6,086,232 A | * | 7/2000 | Schulze et al. | 362/272 |
| 6,122,988 A | * | 9/2000 | Mosler et al. | 188/2 D |
| 6,244,325 B1 | * | 6/2001 | Miller et al. | 160/310 |
| 6,308,804 B1 | * | 10/2001 | Roberts | 188/2 D |

\* cited by examiner

*Primary Examiner*—Christopher P. Schwartz
*Assistant Examiner*—Melody M. Burch
(74) *Attorney, Agent, or Firm*—Porter, Wright, Morris & Arthur (57) ABSTRACT

A manual override mechanism for an electric brake includes a flexible cable having an elongate outer conduit and an elongate inner core extending within the conduit, a conduit end fitting secured to an end of the outer conduit, a housing located within the conduit end fitting and rotatable therein and a core end fitting secured to an end of the inner core. The core end fitting is located within the housing and is longitudinally movable from a first position to a second position such that the end of the inner core moves toward the end of the outer conduit. Preferably, a spring element biases the core end fitting into the second position. Movement from the first position to the second position engages the core with a connecting element such as a helical gear to operably connect the core to the electric parking brake for manual operation thereof.

20 Claims, 7 Drawing Sheets

ELECTRIC PARKING BRAKE MANUAL OVERRIDE

FIELD OF THE INVENTION

The present invention generally relates to parking brakes and, more particularly, to an electrically powered parking brake.

BACKGROUND OF THE INVENTION

Almost all vehicles have a parking brake mechanism, and most of these vehicles have a hand or foot activated lever for manually actuating the parking brake mechanism. Typically, these levers are attached to a cable that causes displacement of the cable and operation of the attached parking brake mechanism. There is a need to provide an electrically actuated cable mechanism that operates reliably with a minimum number of parts and has a low cost, so that manually actuated mechanism may be replaced or easily selectively replaced.

It is known in the art to provide electric-motor driven brake systems. For example, see U.S. Pat. Nos. 4,281,736, 4,561,527, 4,629,043, 4,795,002, 4,865,165, 5,180, 038, 5,485,764, 5,542,513, and 5,590,744 which each disclose an electric motor-driven brake system, the disclosures of which are expressly incorporated herein in their entirety by reference.

While these electrical-motor driven brake systems may adequately actuate the brake mechanisms with varying degrees of success, the electrical drive system occasionally fails and the brake system cannot be applied or released. Accordingly, there is a need in the art for an improved electric parking brake assembly with a manual override system which can selectively operate the brake system when desired. Preferably, the mechanism has over torque protection, is automatically disengaged when not in use, has a relative small package size, has a relatively small number of components, and is relatively light weight.

SUMMARY OF THE INVENTION

The present invention provides an electric parking brake for a motor vehicle which overcomes at least some of the above-noted problems of the related art. According to the present invention, a manual override mechanism for an electric brake comprises, in combination, a rotatable connector to be operably connected to the electric brake assembly, a flexible cable having an elongate outer conduit and an elongate inner core extending within the conduit, and a housing. The inner core has a first end and a second end. A core end fitting is secured to the first end of the inner core. The core end fitting is located within the housing and is longitudinally movable relative to the outer sheath between a first position wherein the second end of the inner core is in operable engagement with the connector to rotate the connector upon rotation of the core end fitting and a second position wherein the second end of the core is out of operable engagement with the connector such that rotation of the core end fitting does not rotate the connector A spring element biases the core end fitting into the second position. The spring biased core end fitting enables the manual override mechanism to be selectively operable by the operator of the motor vehicle.

According to another aspect of the present invention, a manual override mechanism for an electric brake comprises, in combination, a flexible cable having an elongate outer conduit and an elongate inner core extending within the conduit, a conduit end fitting secured to an end of the outer conduit, a housing located within the conduit end fitting and rotatable therein, and a core end fitting secured to a first end of the inner core. The core end fitting is located within the housing. A clutch is provided between the housing and the core end fitting such that rotation of the housing relative to the conduit end fitting causes rotation of the core end fitting when below a predetermined torque and rotation of the housing relative to the conduit end fitting does not cause rotation of the core end fitting when above the predetermined torque. A connector to be operably connected the electric brake assembly and engaged by the second end of the inner core is preferably provided. The clutch prevents damage to the brake assembly due to manual over torque.

According to yet another aspect of the present invention, a manual override mechanism for an electric brake comprises, in combination, a flexible cable having an elongate outer conduit and an elongate inner core extending within the conduit, a conduit end fitting secured to an end of the outer conduit, a housing located within the conduit end fitting and rotatable therein, a core end fitting secured to an end of the inner core. The core end fitting is located within the housing and is longitudinally movable from a first position to a second position such that the end of the inner core moves toward the end of the outer conduit. A clutch is provided between the housing and the core end fitting such that rotation of the housing relative to the conduit end fitting causes rotation of the core end fitting when below a predetermined torque and rotation of the housing relative to the conduit end fitting does not cause rotation of the core end fitting when above the predetermined torque.

From the foregoing disclosure and the following more detailed description of various preferred embodiments it will be apparent to those skilled in the art that the present invention provides a significant advance in the technology of electric parking brakes. Particularly significant in this regard is the potential the invention affords for providing a high quality, reliable, light weight, small packaged, easily assembled and disassembled, low cost assembly having a manual override. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

It should be understood that the appended drawings are not necessarily to scale. presuming a somewhat simplified representation of various preferred features illustrative of the basic principles of the invention. The specific design features of the electric parking brake system as disclosed herein, including, for example, specific dimensions, orientations, and shapes of the transmission and drive nut will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the electric parking brake systems illustrated in the drawings. In general, up or upward refers to an upward direction in the plane of the paper in FIGS. 2 and down or downward refers to a downward direction in the plane of the paper in FIG. 2. Also in general, fore or forward refers to a direction toward the front of the motor vehicle, that is, in a direction in the plane of the paper toward the right of the figure in FIG. 2 and aft or rearward refers to a direction toward the rear of the motor vehicle, that is, in a direction in the plane of the paper toward the left of the figure in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved electrically actuated, motor driven cable tensioning device with manual override disclosed herein. The following detailed discussion of various alternative and preferred embodiments will illustrate the general principles of the invention with reference to an electric parking brake (EPB) system for use with a motor vehicle. Other embodiments suitable for other applications will be apparent to those skilled in the art given the benefit of this disclosure.

The term "snap-fit" connection is used herein and in the claims to mean a connection between at least two components wherein at least one of the components has a protrusion or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "integral" is used herein and in the claims to mean two or more members connected together to form a single body. The term "unitary" is used herein and in the claims to mean a member made of a single continuous material.

The EPB system disclosed herein is designed for use with a motor vehicle, such as an automobile, according to a preferred embodiment of the present invention. While the illustrated embodiments of the present invention are particularly adapted for use with an automobile, it is noted that the present invention can be utilized with any motor vehicle having a parking brake including trucks, buses, vans, recreational vehicles, earth moving equipment and the like, and off road vehicles such as dune buggies and the like.

Figure 1:
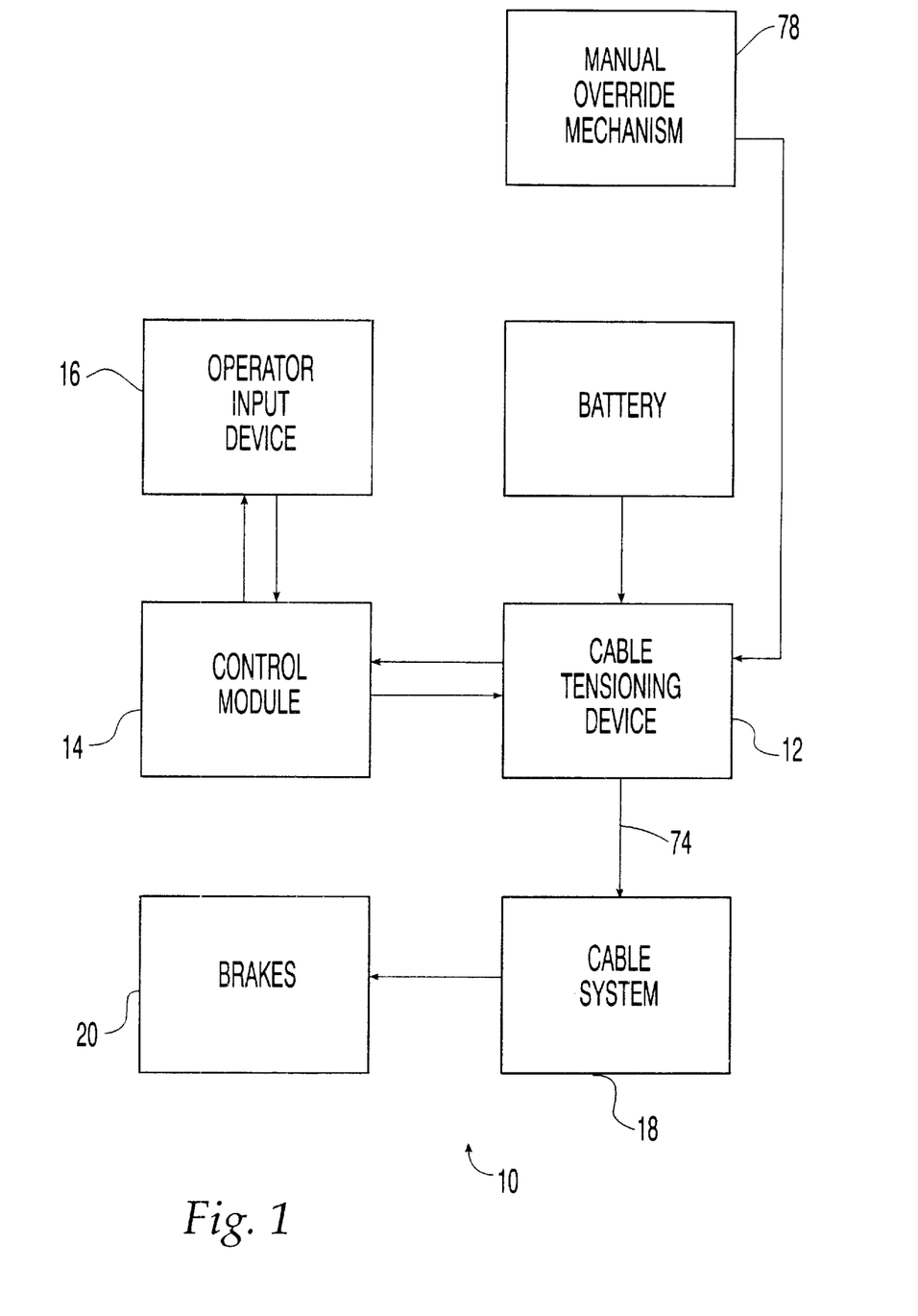
FIG. 1 is a block diagram of an electric parking brake system according to the present invention.

As best shown in FIG. 1, the EPB system 10 according to the present invention preferably comprises a cable tensioning device 12 for producing a linear motion, an electronic controller or control module 14 for controlling the cable tensioning device 12, an operator input device 16 for sending electronic inputs to the control module 14, and a cable system 18 for transmitting the linear motion of the cable tensioning device 12 to park brake arms/pads of a conventional braking system 20.

Figure 2:
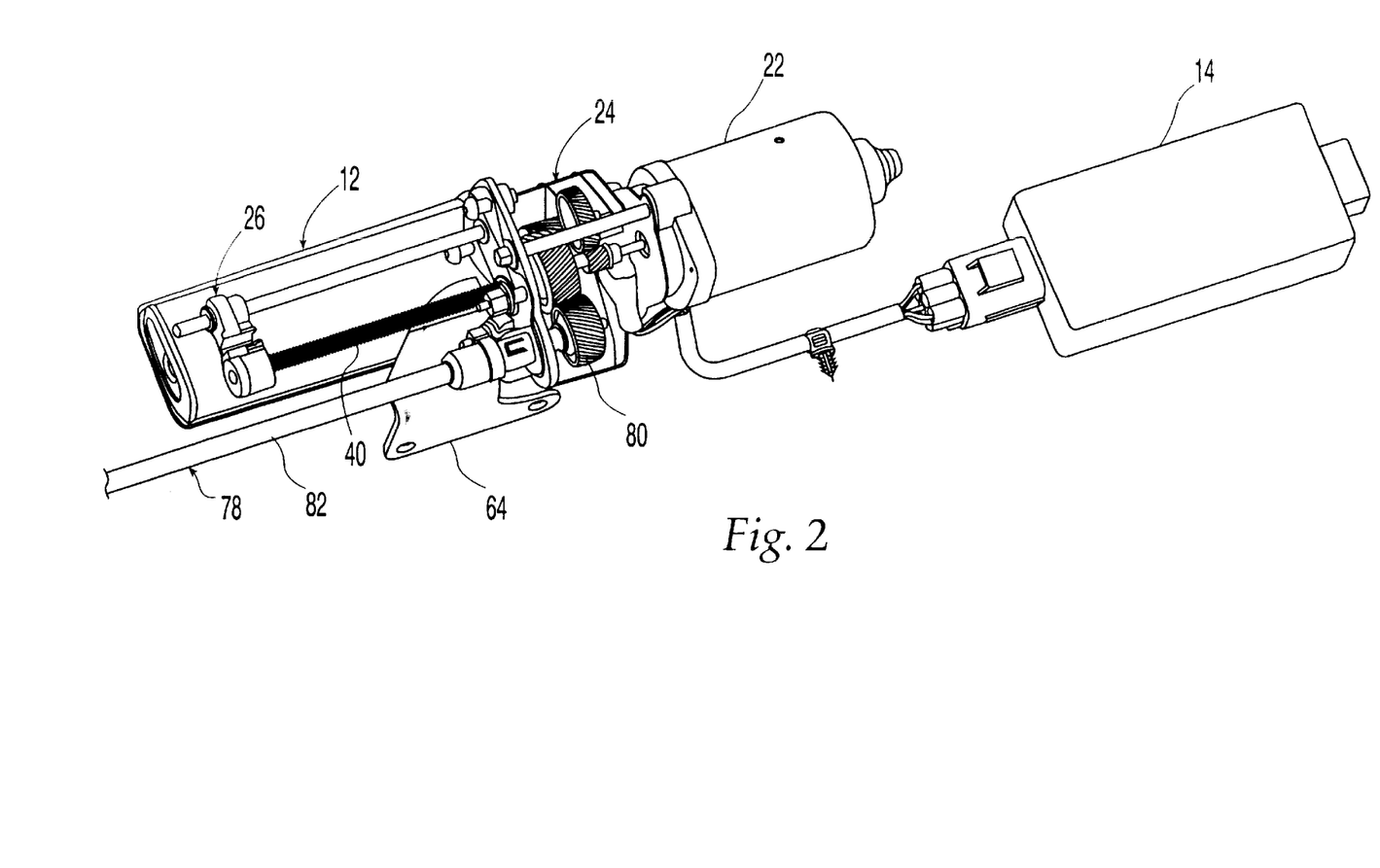
FIG. 2 is a perspective view of the electric parking brake assembly of FIG. 1, wherein some components are removed for clarity and a housing is partially broken for clarity.
Figure 3:
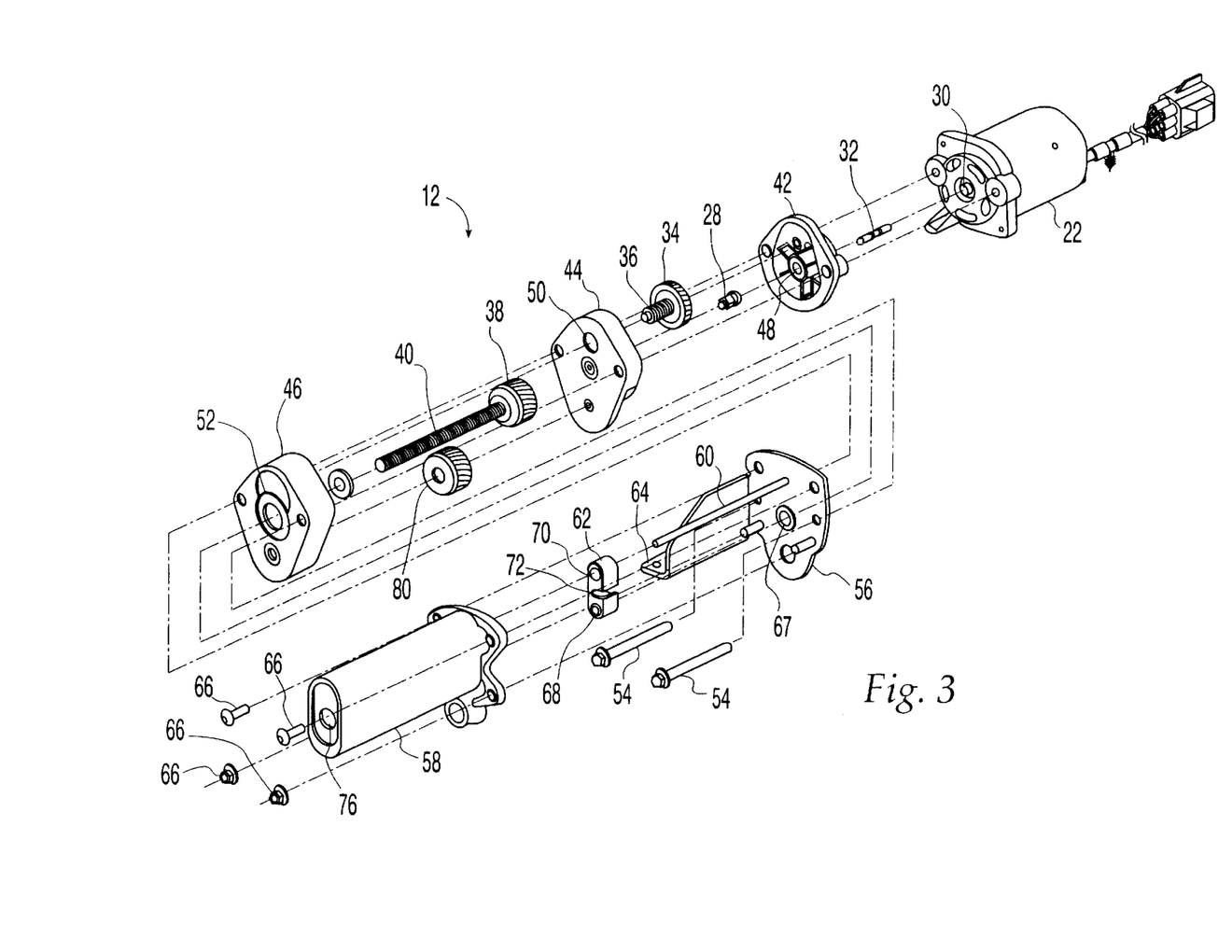
FIG. 3 is an exploded perspective view of the electric parking brake assembly of FIG. 2, with some components removed for clarity.

As shown in FIGS. 2 and 3, the illustrated cable tensioning device 12 includes an electric motor 22, a transmission assembly 24, and a drive nut assembly 26. The electric motor 22 is preferably a permanent magnet direct current (DC) motor, which can selectively rotate in either direction depending on the provided control signal. The electric motor 22 is preferably provided with a sensor for sensing rotations and providing electrical signals representative of the rotations. A suitable sensor is believed to be a Hall effect device or sensor. While the sensor, is preferably integral with the electric motor 22, it is noted that the sensor can be separate from the electric motor 22 and can be located at any suitable location along the power train.

The illustrated transmission assembly 24 includes a gear train of helical or spur gears and transmission housing members generally enclosing the gear train. While the illustrated transmission assembly utilizes helical gears to adjust shaft speed and torque in a desired manner, it is noted that other means for reducing speed and increasing torque can be utilized such as a belt system and other types of gear members can be utilized such as worm gears. The illustrated gear train include a first pinion gear 28 driven by an output or drive shaft 30 of the electric motor 22 through a connecting shaft 32, an idler gear 34 engaging and driven by the first pinion gear 28, a second pinion gear 36 rotatable with the idler gear 34, a lead screw gear 38 engaging and driven by the second pinion gear 36, and a lead screw 40 rotatable with the lead screw gear 38.

The transmission housing assembly includes an end plate 42, a housing 44, and an end cap 46. The illustrated end plate 42 cooperates with the housing 44 to form a first interior chamber for housing the first stage of the gear train, that is, the first pinion gear 28 and the idler gear 34. The end plate 42 has an opening 48 (FIG. 8) therein for connection of the connecting shaft 32 to the first pinion gear 28. The illustrated end cap 46 cooperates with the housing 44 to form a second interior chamber for housing the second stage of the gear train, that is, the second pinion gear 36 and the lead screw gear 38. The housing 44 has an opening 50 (FIG. 8) therein for connection of the idler gear 34 and the second pinion gear 36. The end cap 46 has an opening 52 (FIG. 8) therein for connection of the lead screw gear 38 and the lead screw 40 which extends outside the housing assembly. Suitable means are preferably provided for sealing the opening 52. The components 42, 44, 46 of the illustrated housing assembly are clamped together between the electric motor 22 and the drive nut assembly 26 by a plurality of mechanical fasteners 54. It is noted that the housing assembly can alternatively be secured in any other suitable manner.

The first pinion gear 28 is mounted for rotation, relative to the housing assembly, in a pair of hubs or bushings formed in the end plate 42 and the housing 44. The first pinion gear 28 is preferably substantially coaxial with the drive shaft 30 of the electric motor 22 and connected thereto by the connecting shaft 32. The connecting shaft 32 is preferably a suitable flex shaft to account for any misalignment therebetween. Connected in this manner, the first pinion gear 28 rotates along with the drive shaft 30 of the electric motor 22. The idler gear 34 is mounted for rotation, relative to the housing assembly, in a pair of hubs or bushings formed in the end plate 42 and the housing 44. The rotational axis of the idler gear 34 is preferably substantially parallel and spaced apart from the rotational axis of the first pinion gear 28. The idler gear 34 is positioned such that it engages and interconnects with the first pinion gear 28 so that the idler gear 34 rotates upon rotation of the first pinion gear 28.

The second pinion gear 36 is mounted for rotation, relative to the housing assembly, in a pair of hubs or bushings formed in the housing 44 and the end cap 46. The second pinion gear 36 is preferably substantially coaxial with the idler gear 34 and rigidly connected thereto so that rotation of the idler gear 34 rotates the second pinion gear 36. The idler gear 34 and the second pinion gear 36 can be formed of either integral or unitary members. The lead screw gear 38 is mounted for rotation, relative to the housing assembly, in a pair of hubs or bushings formed in the housing 44 and the end cap 46. The rotational axis of the lead screw gear 38 is preferably substantially parallel and spaced apart from the rotational axis of the second pinion gear 36. The lead screw gear 38 is positioned such that it engages and interconnects with the second pinion gear 36 so that the lead screw gear 38 rotates upon rotation of the second pinion gear 36. Preferably, the lead screw gear 38 is substantially coaxial with the first pinion gear 28, the connecting shaft 32, and the motor drive shaft 30.

The gear elements 28, 34, 36, 38, 40 are sized as required depending on the particular electric motor 22 utilized and the torque and speed requirements of the system 10. The transmission gear train of the illustrated embodiment produces a 9/1 ratio by having two 3:1 stages in series: the first pinion gear 28 to the idler gear 34, and (2) the second pinion gear 36 to the lead screw gear 38. It is noted that the gear train can alternatively have a fewer or greater number of stages, can have stages with different ratios, and can have a different overall ratio.

The illustrated drive nut assembly 26 includes a mounting bracket 56, a cover 58, a guide shaft 60, and a drive nut 62. The mounting bracket 56 and the cover 58 cooperate to form an elongate interior space as described in more detail hereinafter. The illustrated mounting bracket 56 is provided with a mounting flange 64 for securing the cable tensioning device 12 to the motor vehicle. The illustrated mounting bracket 56 cooperates with the mechanical fasteners 54 to clamp the transmission housing members 42, 44, 46 together. The cover 58 is secured to the mounting bracket 56 in any suitable manner such as the illustrated mechanical fasteners 66. It is noted that the mounting bracket 56 and the cover 58 can be alternatively secured in any other suitable manner.

The lead screw 40 is an elongate threaded member sized and shaped to threadably engage the drive nut 62 as described in more detail hereinafter. The lead screw 40 is mounted for rotation, relative to the transmission housing, the mounting bracket 56, and the cover 58, in a hub or bushing located in the mounting bracket 56. Any suitable bushing can be provided. The lead screw 40 is preferably substantially coaxial with the lead screw gear 38, the first pinion gear 28, the connecting shaft 32, and the motor drive shaft 30 and is rigidly connected thereto so that rotation of the lead screw gear 38 rotates the lead screw 40. The lead screw gear 38 and the lead screw 40 can be formed of either integral or unitary members. The mounting bracket 56 has an opening 67 therein for support of the bushing and passage of the lead screw therethrough. Suitable means for sealing the opening 67 are preferably provided. The lead screw 40 preferably extends at least a substantial portion of the interior space formed by the mounting bracket 56 and the cover 58.

The guide shaft 60 is generally elongate and extends substantially parallel and spaced apart from the lead screw 40. In the illustrated embodiment, the guide shaft 60 is located above the lead screw 40. The guide shaft 60 preferably extends at least the full length of the lead screw 40. The guide shaft 60 is sized and shaped to cooperate with the drive nut 62 as described in more detail hereinafter. The illustrated guide shaft 60 has a substantially circular outer surface in cross-section. The guide shaft 60 is supported at its ends by the mounting bracket 56 and the cover 58.

The drive nut 62 is provided with a pair of substantially parallel and spaced apart bores or openings 68, 70. The first bore 68 is adapted to receive the lead screw 40 therein and threaded to cooperate with the lead screw 40 so that rotation of the lead screw 40 causes the drive nut 62, when held against rotation therewith, to axially move along the length of the lead screw 40 as the lead screw 40 rotates. The second bore 70 is adapted to receive the guide shaft 60 therein and is generally smooth to cooperate with the guide shaft 60 so that the drive nut 62 is held against rotation with the lead screw 40 and slides along the guide shaft 60 as the drive nut 62 travels along the lead screw 40. The drive nut 62 is also provided with an attachmnent 72 for connecting a flexible cable 74 (FIGS. 9 and 10) of the cable system 18. The illustrated attachment 72 includes a notch for receiving a connector of core or strand of the flexible cable 74. It is noted that the attachment 72 is preferably provided as near the first bore 68 as possible so that the flexible cable 74 is as close as possible to the axis of the lead screw 40 to limit the amount of off-axis loading and resulting efficiency losses. The illustrated attachment 72 is centrally located between the spaced apart bores 68, 70 so that the axis of the attachment 72, and thus the line of force of the cable 74, is located centrally therebetween. The cover 58 is provided with an opening 76 for connection of the cable 74 to the drive nut 62. The opening 76 is preferably sealed in a suitable manner.

It is noted that the axis of the attachment 72, and the cable 74 attached thereto, is offset from the rotation axis of the lead screw 40. This arrangement dramatically reduces the packaging size because it eliminates the interference which is present when a coaxial attachment is used with a generally short drive nut. To eliminate the interference, a relatively long drive nut has typically been utilized which increases the packaging size. The offset of the present invention permits the use of a relatively short drive nut 62 and thus a much smaller packaging size. The drive nut 62 is preferably has a length less than about ¼ the length of the lead screw 40, more preferably less than about ⅕ the length of the lead screw 40, and even more preferably less than about ⅙ the length of the lead screw 40. In the illustrated embodiment, the drive nut 62 has a length which is about ⅐ the length of the lead screw 40.

It is noted that the electric motor 22 is preferably reversing, that is, it operates to rotate in both directions. However, the lead screw is non-reversing to retain generated cable load, that is, the force of the tensed cable 74 is borne mechanically by the pitch of the lead screw 40 and the cooperating drive nut 62. By utilizing a purely mechanical element, this cable tension is held indefinitely, or until an input is supplied to release the EPB system 10. During the period of time when cable tension is being held and the EPB system 10 is not in an apply or release cycle, current draw by the motor 22 on the vehicle electrical system is 0 amps.

While the cable tensioning device 12 of the illustrated embodiment can be located at any expedient location upon the motor vehicle, the device 12 is ordinarily located within an interior region of the motor vehicle (e.g., trunk, spare tire compartment, behind truck seat, or other location). By locating the device 12 in an interior location, corrosive and vibrational effects of the environment are reduced. It is noted, however, that the device 12 of the present invention is provided in sealed housings and thus can be located in any desired location. To minimize cost of cables, the electric motor 22 can be located as close to the rear or braked wheels as possible.

The illustrated EPB system 10 also includes a manual override mechanism 78 so that the operator can selectively manually apply and release the parking brakes 20 without utilization of the electric motor 22. The manual override mechanism 78 includes a connector or override gear 80 which is operably connected to the lead screw 40 via the transmission assembly 24 and a cable assembly 82 selectively connected to the override gear 80 to manually rotate the lead screw 40 via the override gear 80. The override gear 80 is mounted for rotation, relative to the housing assembly, in a pair of hubs or bushings formed in the housing 44 and the end cap 46. The rotational axis of the override gear 80 is preferably substantially parallel and spaced apart from the rotational axis of the lead screw gear 38. The override gear 80 is positioned such that it engages and interconnects with the lead screw gear 38 so that the lead screw gear 38 rotates upon rotation of the override gear 80. Preferably, the override gear 80 is located on an opposite side of the lead screw gear 38 from the second pinion gear 36. In the illustrated embodiment, the second pinion gear 36 is located above the lead screw gear 38 and the override gear 80 is located below the lead screw gear 36.

Figure 4:
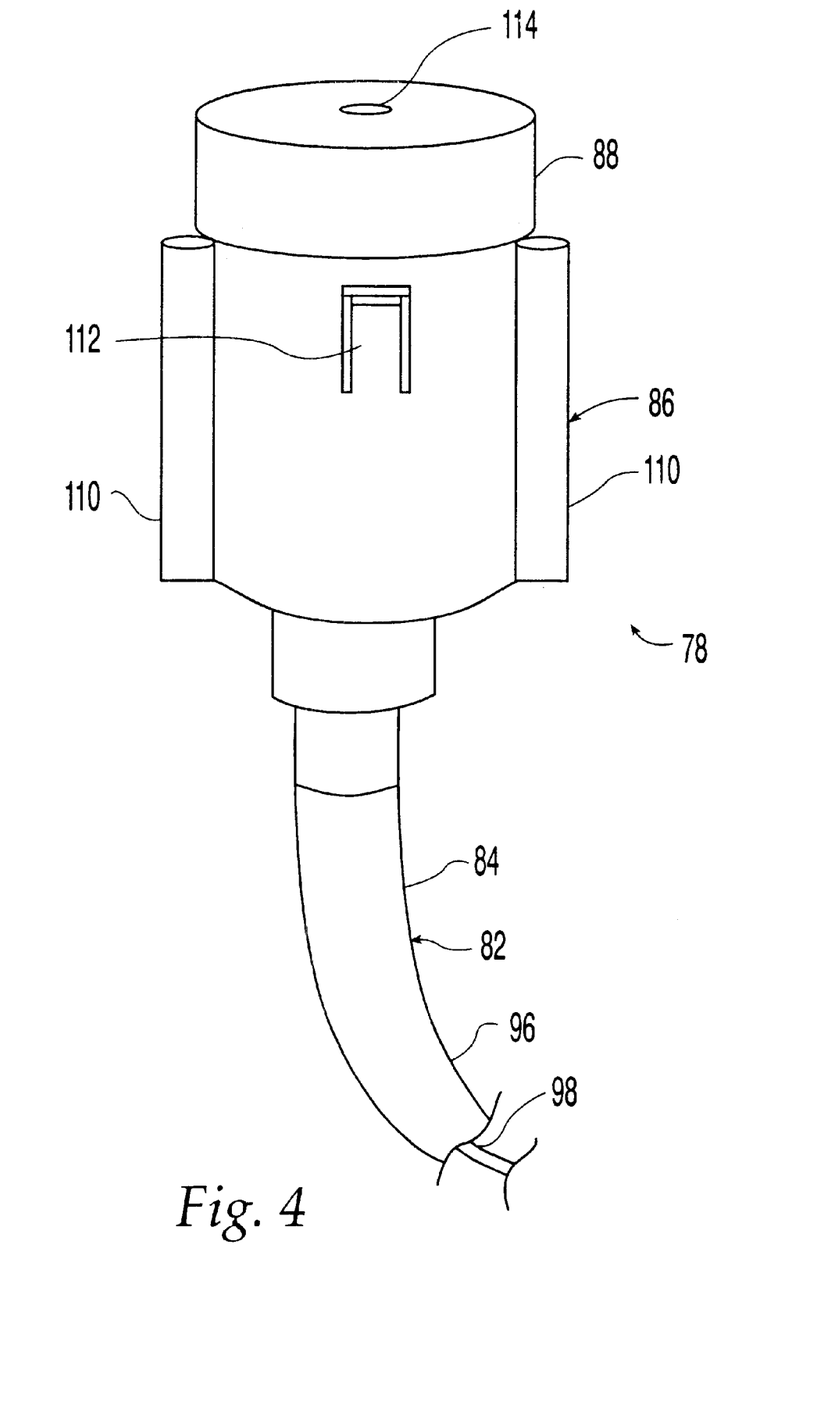
FIG. 4 is a perspective view of a portion of the manual override mechanism of the electric parking brake assembly of FIG. 1.
Figure 5:
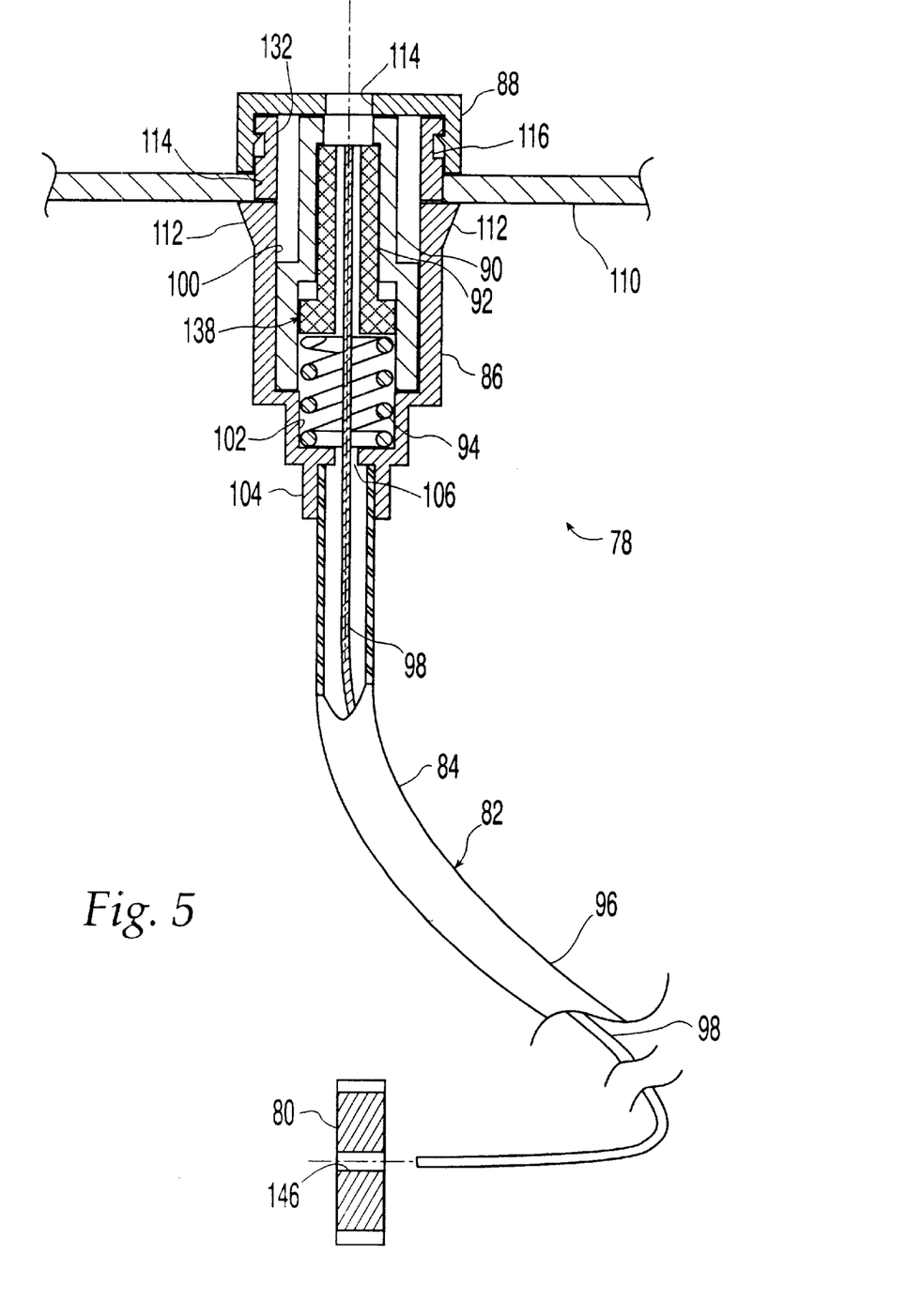
FIG. 5 is an elevational view, in cross-section, of the portion of the manual override mechanism shown in FIG. 4.

As best shown in FIGS. 4 and 5, the illustrated cable assembly 82 includes a motion-transmitting flexible cable 84, a conduit end fitting 86, a cap 88 secured to the conduit end fitting 86, a housing 90 located within the conduit end fitting 86, a core end fitting 92 located within the housing 90, and a spring element 94. The flexible cable 84 is preferably a push-pull or Bowden cable having an elongate outer sheath or conduit 96 and an elongate inner strand or core 98 which extends within the outer conduit 96. The inner core 98 is longitudinally slidable within the outer conduit 96 and rotatable within the outer conduit 96 to transfer motion between the ends of the flexible cable 84.

As best shown in FIGS. 5, and 6–8, the conduit end fitting 86 is generally cylindrically-shaped having bore 100 therein which forms an inner cavity or space. The lower end (as viewed in the figures) of the bore 100 is provided with a reduced diameter portion which forms a seat 102 for the spring element 94. The end of the reduced diameter portion is formed by an upward (as viewed in the figures) facing abutment sized and shaped for engagement by the spring element 94 as described in more detail hereinbelow. The outer end of the reduced diameter portion is provided with a conduit connector. The illustrated conduit connector 104 is generally tubular shaped and sized for receiving the first end of the outer conduit 96 therein. The conduit connector 104 is preferably at least partially blind or closed to form an abutment which is engaged by the end of the outer conduit 96. With the first end of the outer conduit 96 in the conduit connector 104, the outer conduit 96 is rigidly connected to the conduit end fitting 86 to substantially prevent relative motion therebetween. An opening 106 is provided for passage of the inner core 98 from the conduit connector 104 to the interior of the conduit end fitting 86.

Figure 6:
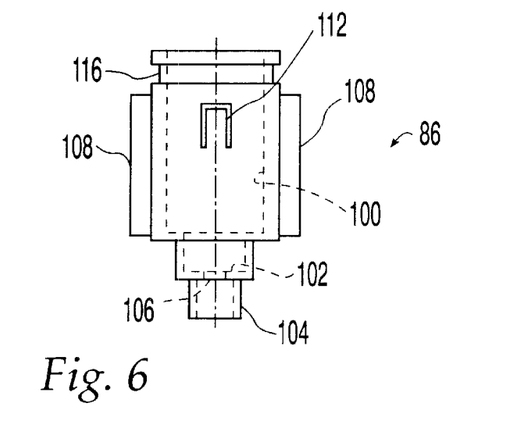
FIG. 6 is a side view of a cable end fitting of the manual override mechanism of FIGS. 4 and 5.
Figure 7:
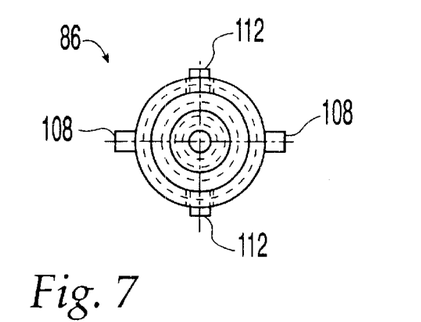
FIG. 7 is an end view of the cable end fitting of FIG. 6.
Figure 8:
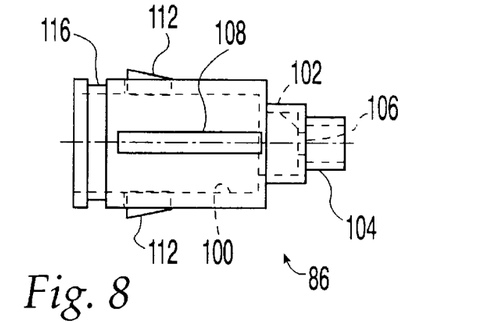
FIG. 8 is a side view of the cable end fitting of FIGS. 6 and 7.

The outer periphery of the conduit end fitting 86 is provided with a pair of guides or keys 108 which project radially outward from opposed sides of the outer surface. The keys 108 are generally rectangular-shaped in cross-section and extend a substantial portion of the longitudinal length of the conduit end fitting 86. The keys 108 are preferably sized and shaped to orient the conduit end fitting 86 relative to a mounting panel 110 and/or limit rotation of the conduit end fitting 86 relative to the mounting panel 110. The outer periphery of the conduit end fitting 86 is also provided with a pair of flexible protrusions 112 which project radially outward from opposed sides of the outer surface. The protrusions 112 are preferably located midway between the keys 108. The protrusions 108 are sized and shaped to form a snap-fit connection with the mounting panel 110 to secure the conduit end fitting 86 to the mounting panel 110 when the conduit end fitting 86 is inserted into an opening 114 in the mounting panel 110. The outer periphery of the conduit end fitting 86 is further provided with a groove 116 which encircles the outer surface near the end opposite the conduit connector 104. The illustrated groove 116 is sized and shaped to cooperate with the cap 88 to form a snap-fit connection as described in more detail hereinbelow.

Figure 9:
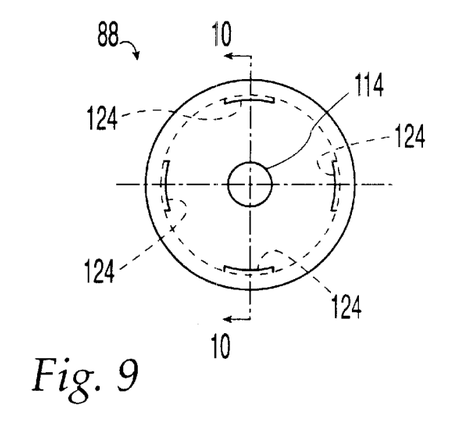
FIG. 9 is an end view of a cap of the manual override mechanism of FIGS. 4 and 5.
Figure 10:
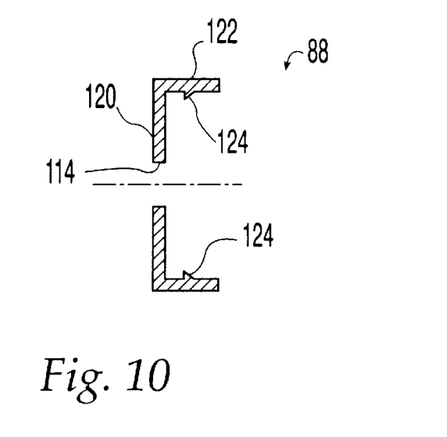
FIG. 10 is a cross-sectional view taken along line 10—10 of FIG. 9.

As best shown in FIGS. 5, 9, and 10, the cap 88 is sized and shaped to generally enclose the open end of the conduit end fitting 86 except for a tool-passage opening 118 provided centrally therein. The opening 118 is sized and shaped to provide clear passage of an adjustment tool therethrough as described in more detail hereinafter. The illustrated cap 88 is provided with a main wall 120 and a side wall 122 downwardly extending from the outer periphery of the main wall 120. A plurality of spaced-apart and inwardly extending protrusions or projections 124 are provided on the inner side of the side wall 122. The upper or inner end of the protrusions 124 form generally planar abutments generally perpendicular to the side wall. The protrusions 124 are sized and shaped to cooperate with the groove 116 of the conduit end fitting t86 o form a snap-fit connection therebetween to secure the cap 88 to the conduit end fitting 86. The outer or lower ends of the protrusions 124 are preferably provided with angled camming surface to aid in outwardly deflecting the side wall 122 during installation of cap 88 onto the conduit end fitting 86.

Figure 11:
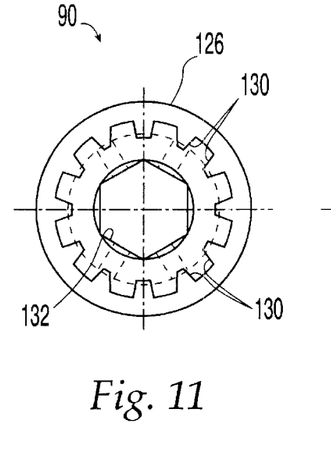
FIG. 11 is an end view of a housing of the manual override mechanism of FIGS. 4 and 5.
Figure 12:
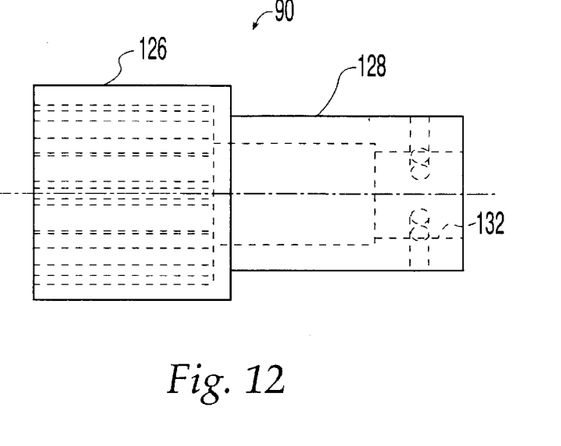
FIG. 12 is a side view of the housing of FIG. 11.

As best shown in FIGS. 5, 11, and 12, the housing 90 is generally tubular-shaped having a first portion 126 sized for close receipt in the bore 100 of the conduit end fitting 86 and a second portion 128 of reduced diameter. A plurality of circumferentially spaced-apart teeth 130 located about the periphery of the bore or passage of the first portion 126. The illustrated teeth 130 axially extend the full length of the first portion bore and form abutments on opposite sides thereof. The teeth 130 are sized and shaped to cooperate with the core end fitting 92 as described in more detail hereinafter. The outer end of the second portion 128 is provided with an opening 132 which is sized and shaped to cooperate with the adjustment tool to transfer rotational motion and/or torque therebetween. The illustrated opening 132 is hexagonnally-shaped but other suitable torque-transferring shapes can be utilized such as, for example, other polygons, stars, and the like.

The housing 90 is positioned within the interior cavity of the conduit end fitting 86 and is rotatable therein relative to the conduit end fitting 86 about the central axis. Axial movement of the housing 90 relative to the conduit end fitting 86 is limited between the cap 88 and an abutment formed at the intersection of the conduit end fitting main portion and reduced diameter portion.

Figure 13:
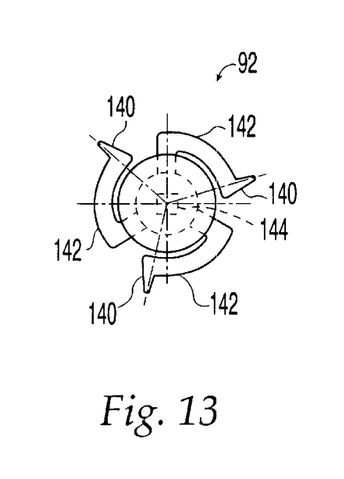
FIG. 13 is an end view of a clutch of the manual override mechanism of FIGS. 4 and 5.
Figure 14:
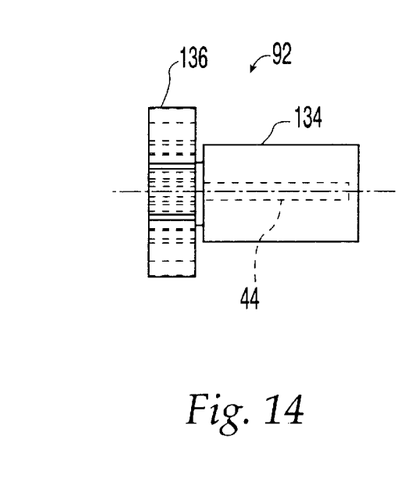
FIG. 14 is a side view of the clutch of FIG. 13.

As best shown in FIGS. 5, 13, and 14, the core end fitting 92 is generally cylindrically-shaped having a first portion 134 sized for close receipt in the bore of the housing second portion 128 and a second portion 136 sized and shaped to cooperate with the housing 90 to form a torque-limiting clutch 138 therebetween. A plurality of circumferentially-spaced-apart fingers 140 which extend radially outward from the outer periphery of the second portion 136. The fingers 140 are sized and shaped for cooperation with the teeth 130 of the housing 90 to transfer rotational motion and/or torque therebetween. The fingers 140 are also deflectable in a radially inward direction such that rotational motion and/or torque is not transferred therebetween when the torque is above a predetermined amount. The illustrated fingers 140 are secured to the second portion by resiliently flexible arms 142 having a first or radial portion perpendicularly extending from the end fitting outer surface and a second or circumferential portion circumferentially extending from the outer end of the radial portion to the finger 140. The illustrated embodiment has three fingers 140 but a larger or smaller number of fingers 140 can be utilized. An axially extending passage or bore 144 is provided within the core end fitting 92 which opens at the end of the second portion 136. The passage 144 is sized and shaped for close receipt of a first end of the inner core 98 therein to secure the inner core to the core end fitting and substantially prevent relative movement therebetween. The illustrated passage 144 and inner core end are generally square-shaped in cross-section.

The core end fitting 92 is positioned within the housing 90 with the fingers 140 interlocking the teeth 130 of the housing 90. The inner core 98 extends from the conduit connector 104 and through the opening 106 to the passage 144 of the core end fitting 92. Below the predetermined torque, the rotating housing 90 rotates the core end fitting 92 therewith via the clutch members. Above the predetermined torque, the rotating housing 90 rotates relative to the core end fitting 92 as the clutch fingers 140 deflect inwardly to disengage the fingers 140 from the teeth 130.

The core end fitting 92 is axially movable relative to the housing 90 and between a first or inoperative position (shown in FIG. 5) and a second or operative position (not specifically shown) wherein the core end fitting 92 is closer to the end of the outer conduit 96 than in the first position to insert an additional predetermined length of the inner core 98 into the outer conduit 96. As best shown in FIG. 5, the spring element 94 is positioned to bias the core end fitting 92 into the first or inoperative position. The illustrated spring element 94 is a coil spring operating between the seat formed by the conduit end fitting 86 and the end of the core end fitting 92. It is noted that other types of spring elements such as, for example, leaf springs can be utilized within the scope of the present invention.

The predetermined length of the inner core 98 which is moved between the first and second positions is sized to disengage and engage the inner core 98 from the override gear 80. The second end of the inner core 98 is disengaged from the override gear 80 when the core end fitting 92 is in the first position and is operably engaged with the override gear 80 when the core end fitting 92 is in the second position. The interface between the second end of the inner core 98 and the override gear 80 is sized and shaped to transmits rotational motion and/or torque from the core to the override gear 80. The second end of the inner core and the cooperating override gear opening 146 are preferably square-shaped in cross section.

The first end of the cable assembly 82 is preferably located within the vehicle interior for allowing the vehicle operator to selectively manually operate the cable tensioning device 10. A suitable mounting panel can be, for example, a portion of a motor vehicle console.

The conduit end fitting 86, the cap 88, the housing 90, and the core end fitting 92 can each be formed of any suitable material such as, for example, a plastic material, a composite comprising a plastic material, or the like.

As best shown in FIGS. 1–3, the control module 14 is provided with suitable logic and memory electronics for electrically operating the cable tensioning device 12 in a desired manner. The control module 14 receives input signals from the operator input device 16 and the cable tensioning device 12. The operator input device 16 preferably sends signals to the control module 14 to apply or release the parking brakes 20. It is noted that the control module 14 can alternately or additionally receive signals from a motor vehicle control system to automatically apply or release the parking brakes 20 as desired. The cable tensioning device 12 preferably sends signals to the control module 14 indicating cable tension, such as the operating current of the electric motor 22, and signals indicating cable travel, such as rotational information from the hall effect sensor indicating the number of rotations of the electric motor 22. The control module 14 preferably sends signals to the operator input device 16 indicating that the parking brakes 20 are applied or that there has been a failure to apply or release the parking brakes. The control module 14 preferably sends signals to the cable tensioning device 12 to start and stop the electric motor 22 when the brakes are applied or released.

The operator input device 16 is preferably located within the vehicle interior for allowing the vehicle operator to selectively send signals to the control module 14. While any suitable control device 16 can be employed, the input device 16 preferably includes an input switch so that the operator can manually select to apply or release the parking brakes 20 and an illuminated indicator or brake light on the vehicle's instrument panel that, indicates the status of the parking brakes 20. The switch and the brake light are electrically connected to the control module 14. The instrument panel brake light is illuminated by the control module 14 only upon the completion of a "successful" parking brake application cycle such as, for example, reaching the predetermined shut off motor current. The control module 14 does not illuminate the instrument panel brake light when the vehicle ignition key is in the "off" position. If a parking brake application cycle is not "successful", such as, for example, the predetermined cut-off current is not reached within the predetermined distance, the control module 14 pulses illumination of the brake light to indicate an EPB system fault (e.g., "blinking light" pulse at a rate of two pulses per second). If the EPB system 10 is applied with the vehicle ignition key in the "off" position, the control module 14 illuminates the instrument panel brake light immediately upon the operator turning the vehicle ignition key to the "on" position. Regardless of the EPB system status or operator input, the instrument panel brake light is not illuminated with the vehicle ignition key in the "off" position at any time.

The cable system 18 can be a conduit-reaction-type cable system which transmits load to the brake 20 via a conduit reaction bracket in a well known manner or the cable system 18 can alternatively be a non-conduit-reaction-type system in a well known manner. See U.S. patent application Ser. No. 09/728174, filed the same day as the present application and entitled "Electric Parking Brake", the disclosure of which is expressly incorporated herein in its entirety by reference, which discloses a suitable conduit reaction system and a non-conduit reaction system.

In operation, when the operator of the motor vehicle desires to electrically apply the parking brakes 20, the operator sends an apply signal to the control module 14 via the operator input device. In response to the apply signal, the control module 14 starts rotation of the output shaft 30 of the electric motor 22 in the suitable direction. Rotation of the motor output shaft 30 moves the gear train to rotate the lead screw 40. In the illustrated embodiment, rotation of the motor output shaft 30 rotates the first pinion gear 28 via the connecting shaft 32, rotation of the first pinion gear 28 rotates the idler gear 34 through the interlocking teeth therebetween, rotation of the idler gear 34 rotates the second pinion gear 36 through the rigid connection therebetween, rotation of the second pinion gear 36 rotates the lead screw gear 38 through the interlocking teeth therebetween, and rotation of the lead screw gear rotates the lead screw 40 through the rigid connection therebetween. Rotation of the lead screw 40 causes translation of the drive nut 62, toward the gear train and away from the cable assembly 18, which is threadably engaged on the lead screw 40 and held against rotation by the guide shaft 60. The translation of the drive nut 62 pulls and tensions the cable 74 to apply the brakes 20. As the drive nut 62 axially translates along the drive screw 40, the drive nut slides along the guide shaft. When the brakes are adequately applied, the control module 14 stops the electric motor 22 and illuminates the brake light on the vehicle's instrument panel to indicate a successful application of the brakes 20.

When the operator of the motor vehicle desires to electrically release the parking brakes 20, the operator sends a release signal to the control module 14 via the operator input device. In response to the release signal, the control module 14 starts rotation of the output shaft 30 of the electric motor 22 in the suitable direction, which is opposite the apply direction. Rotation of the motor output shaft 30 moves the gear train to rotate the lead screw 40. In the illustrated embodiment, rotation of the motor output shaft 30 rotates the first pinion gear 28 via the connecting shaft 32, rotation of the first pinion gear 28 rotates the idler gear 34 through the interlocking teeth therebetween, rotation of the idler gear 34 rotates the second pinion gear 36 through the rigid connection therebetween, rotation of the second pinion gear 36 rotates the lead screw gear 38 through the interlocking teeth therebetween, and rotation of the lead screw gear rotates the lead screw 40 through the rigid connection therebetween. Rotation of the lead screw 40 causes translation of the drive nut 62, away from the gear train and toward the cable assembly 18, which is threadably engaged on the lead screw 40 and held against rotation by the guide shaft 60. The translation of the drive nut 62 releases and untensions the cable 74 to release the brakes 20. As the drive nut 62 axially translates along the drive screw 40, the drive nut slides along the guide shaft. When the brakes are adequately released, the control module 14 stops the electric motor 22 and illuminates the brake light on the vehicle's instrument panel to indicate an successful release of the brakes.

When the operator desires to manually apply the parking brakes 20 with the manual override mechanism 78, the operator inserts an application tool through the opening 114 in the cap 89 and the opening 132 in the housing 90 until the tool engages the end of the core end fitting 92. The force of the tool insertion overcomes the bias of the spring element 94 and moves the core end fitting 92 from the first position to the second position. The movement of the core end fitting 92 moves the inner core 98 further into the outer conduit 98 toward the override gear 80 and into operative engagement, that is torque-transmitting engagement, with the override gear 80. The operator manually rotates the tool which rotates the housing 90 via the torque-transferring connection, which rotates the core end fitting 98 via the torque-limiting clutch 138, which rotates the inner core 98 via the torque-transferring connection, which rotates override gear 98 via the torque-transferring connection. The rotating override gear 80 rotates the lead screw gear 38 and thus the lead screw 40 to operate the cable tensioning device 12 in the same manner as when electrically operated. When the predetermined torque is reached, the fingers 140 are inwardly deflected by the teeth 130 to remove the torque-transferring connection between the housing 90 and the core end fitting 92 and stop the rotation of the core end fitting 96 and the components rotated thereby. The tool is then removed by the operator from the openings 114, 132 and the spring element 94 resiliently returns the core end fitting 92 to the first position and thereby disengages the inner core 98 from the override gear 80. The automatic disengagement of the cable assembly 82 prevents the inner core 98, and components attached thereto, from rotating when the motor 22 is driving the cable tensioning device 12.

When the operator of the motor vehicle desires to manually release the parking brakes 20, the process is the same as described hereinabove for manually applying the parking brakes 20 except that the tool is rotated in the release direction which is the opposite direction of the apply direction.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the clutch members 130, 140 can each have many different configurations and can be formed of many different manners. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A manual override mechanism for an electric brake comprising, in combination:
    a connector to be operably connected to the electric brake assembly;
    a flexible cable having an elongate outer conduit and an elongate inner core extending within the conduit, the inner core having a first end and a second end;
    a housing;
    a core end fitting secured to the first end of the inner core, the core end fitting located within the housing and longitudinally movable relative to the outer conduit between a first position wherein the second end of the inner core is in operable engagement with the connector to rotate the connector upon rotation of the core end fitting and a second position wherein the second end of the inner core is out of operable engagement with the connector such that rotation of the core end fitting does not rotate the connector; and a spring element biasing the core end fitting into the second position.

2. The manual override mechanism according to claim 1, wherein the connector is a gear.

3. The manual override mechanism according to claim 1, further comprising a conduit end fitting having an end of the outer conduit secured thereto and wherein the housing is located within the conduit end fitting.

4. The manual override mechanism according to claim 3, wherein the housing is rotatable relative to the conduit end fitting.

5. The manual override mechanism according to claim 4, further comprising a clutch between the housing and the core end fitting such that rotation of the housing relative to the conduit end fitting causes rotation of the core end fitting when below a predetermined torque and rotation of the housing relative to the conduit end fitting does not cause rotation of the core end fitting when above the predetermined torque.

6. The manual override mechanism according to claim 3, wherein the spring element is a coil spring operating between the core end fitting and the conduit end fitting.

7. The manual override mechanism according to claim 3, wherein the housing has an opening for insertion of a tool therethrough to overcome the bias of the spring element and move the core end fitting from the first position to the second position.

8. A manual override mechanism for an electric brake comprising, in combination:

a flexible cable having an elongate outer conduit and an elongate inner core extending within the conduit, the inner core having a first end and a second end;

a conduit end fitting secured to an end of the outer conduit;

a housing located within the conduit end fitting and rotatable therein;

a core end fitting secured to the first end of the inner core, the core end fitting located within the housing;

a clutch between the housing and the core end fitting such that rotation of the housing relative to the conduit end fitting causes rotation of the core end fitting when below a predetermined torque and rotation of the housing relative to the conduit end fitting does not cause rotation of the core end fitting when above the predetermined torque; and a connector to be operably connected to the electric brake and engaged by the second end of the inner core.

9. The manual override mechanism according to claim 1, wherein the connector is a gear.

10. The manual override mechanism according to claim 8, wherein the clutch includes a plurality of flexible fingers extending from a periphery of the core end fitting and a plurality of spaced-apart abutments located about a circumference of the housing, wherein the fingers engage the abutments to rotate the core end fitting below the predetermined torque and the fingers flex out of engagement with the abutments above the predetermined torque.

11. The manual override mechanism according to claim 10, wherein the fingers are unitary with the core end fitting.

12. The manual override mechanism according to claim 10, wherein the abutments are unitary with the housing.

13. The manual override mechanism according to claim 10, wherein the core end fitting has a central longitudinal axis and the fingers are radially deflectable inward toward the central longitudinal axis.

14. The manual override mechanism according to claim 8, wherein the housing has an opening for insertion of a tool therein to manually rotate the housing relative to the conduit end fitting.

15. The manual override mechanism according to claim 8, wherein the core end fitting is longitudinally movable relative to the conduit end fitting between a first position wherein the second end of the inner core is in operable engagement with the connector to rotate the connector upon rotation of the core end fitting and a second position wherein the second end of the core is out of operable engagement with the connector such that rotation of the core end fitting does not rotate the connector.

16. The manual override mechanism according to claim 15, further comprising a spring element biasing the core end fitting into the second position.

17. A manual override mechanism for an electric brake comprising, in combination:

a flexible cable having an elongate outer conduit and an elongate inner core extending within the outer conduit;

a conduit end fitting secured to an end of the outer conduit;

a housing located within the conduit end fitting and rotatable therein;

a core end fitting secured to an end of the inner core, the core end fitting located within the housing and longitudinally movable from a first position to a second position such that the end of the inner core moves toward the end of the outer conduit; and a clutch between the housing and the core end fitting such that rotation of the housing relative to the conduit end fitting causes rotation of the core end fitting when below a predetermined torque and rotation of the housing relative to the conduit end fitting does not cause rotation of the core end fitting when above the predetermined torque.

18. The manual override mechanism according to claim 17, further comprising a spring element biasing the core end fitting into the first position.

19. The manual override mechanism according to claim 17, wherein the housing has an opening for insertion of a tool therethrough to overcome the bias of a spring element and move the core end fitting from the first position to the second position and to manually rotate the housing relative to the conduit end fitting.

20. The manual override mechanism according to claim 17, wherein the clutch includes a plurality of flexible fingers extending from a periphery of the core end fitting and a plurality of spaced-apart abutments located about a circumference of the housing, wherein the fingers engage the abutments to rotate the core end fitting below the predetermined torque and the fingers flex out of engagement with the abutments above the predetermined torque.

* * * * *